(12) United States Patent
Herrmann et al.

(10) Patent No.: US 9,995,384 B2
(45) Date of Patent: Jun. 12, 2018

(54) HYDRAULIC CONTROL DEVICE FOR AN AUTOMATIC TRANSMISSION

(71) Applicant: ZF Friedrichshafen AG, Friedrichschafen (DE)

(72) Inventors: Markus Herrmann, Scheidegg (DE); Josef Haupt, Tettnang (DE); Horst Roegner, Oberteuringen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days. days.

(21) Appl. No.: 15/505,434

(22) PCT Filed: Jul. 21, 2015

(86) PCT No.: PCT/EP2015/066588
§ 371 (c)(1),
(2) Date: Feb. 21, 2017

(87) PCT Pub. No.: WO2016/026636
PCT Pub. Date: Feb. 25, 2016

(65) Prior Publication Data
US 2017/0268659 A1 Sep. 21, 2017

(30) Foreign Application Priority Data
Aug. 21, 2014 (DE) ......................... 10 2014 216 580

(51) Int. Cl.
*F16H 61/00* (2006.01)
*F16K 15/18* (2006.01)
(Continued)

(52) U.S. Cl.
CPC ......... *F16H 61/0021* (2013.01); *F16D 25/10* (2013.01); *F16D 48/0206* (2013.01);
(Continued)

(58) Field of Classification Search
None
See application file for complete search history.

(56) References Cited

U.S. PATENT DOCUMENTS 3,626,968 A * 12/1971 Hancock ................. F16D 25/14
137/115.26
4,620,417 A 11/1986 Wuchenauer
(Continued)

FOREIGN PATENT DOCUMENTS

CH         514790 A    10/1971
DE       1945951 A1    3/1971
(Continued)

OTHER PUBLICATIONS

German Search Report DE102014216580.6, dated Jun. 30, 2015. (10 pages).
(Continued)

*Primary Examiner* — Justin Holmes
(74) *Attorney, Agent, or Firm* — Dority & Manning, P.A.

(57) ABSTRACT

A hydraulic control device for an automatic transmission includes a shut-off valve arranged between a first pressure adjusting device and a respective shifting element cylinder of a plurality of shifting elements. In the first shifting position of the shut-off valve, the first pressure adjusting device is hydraulically connected to the respective shifting element cylinder through the shut-off valve. In the second shifting position of the shut-off valve, the shifting element cylinder is sealed by the shut-off valve relative to the first pressure adjusting device. The shut-off valve is an releasable check valve. The releasable check valve includes a check valve and an unblocking device. The unblocking device is actuatable by a control pressure from a second pressure adjusting device.

17 Claims, 7 Drawing Sheets

(51) Int. Cl.
  *F16H 61/30* (2006.01)
  *F16D 25/10* (2006.01)
  *F16D 48/02* (2006.01)

(52) U.S. Cl.
  CPC ........... *F16H 61/30* (2013.01); *F16K 15/183* (2013.01); *F16D 2048/0209* (2013.01); *F16D 2048/0221* (2013.01); *F16D 2048/0281* (2013.01); *F16D 2500/108* (2013.01)

(56) References Cited

U.S. PATENT DOCUMENTS

| | | | |
|---|---|---|---|
| 4,864,823 A * | 9/1989 | Ikejiri | ..................... F16H 61/40 184/7.1 |
| 5,337,564 A | 8/1994 | Bakke et al. | |
| 6,544,139 B1 | 4/2003 | Gierer et al. | |
| 2009/0232673 A1 | 9/2009 | Reisch et al. | |
| 2010/0003577 A1 * | 1/2010 | Eguchi | .............. H01M 8/04201 429/515 |
| 2013/0075222 A1 * | 3/2013 | Ari | ......................... F16D 25/12 192/85.63 |
| 2016/0265657 A1 | 9/2016 | Herrmann et al. | |

FOREIGN PATENT DOCUMENTS

| | | |
|---|---|---|
| DE | 2033170 A1 | 1/1972 |
| DE | 2445699 A1 | 4/1976 |
| DE | 2705674 A1 | 8/1978 |
| DE | 3338595 A1 | 5/1985 |
| DE | 69103628 T2 | 4/1995 |
| DE | 19858541 A1 | 6/2000 |
| DE | 10205411 A1 | 8/2003 |
| DE | 102005013137 A1 | 9/2006 |
| DE | 102013221038 A1 | 4/2015 |

OTHER PUBLICATIONS

International Search Report (English Translation) PCT/EP2015/066588, dated Dec. 17, 2015. (3 pages).

* cited by examiner

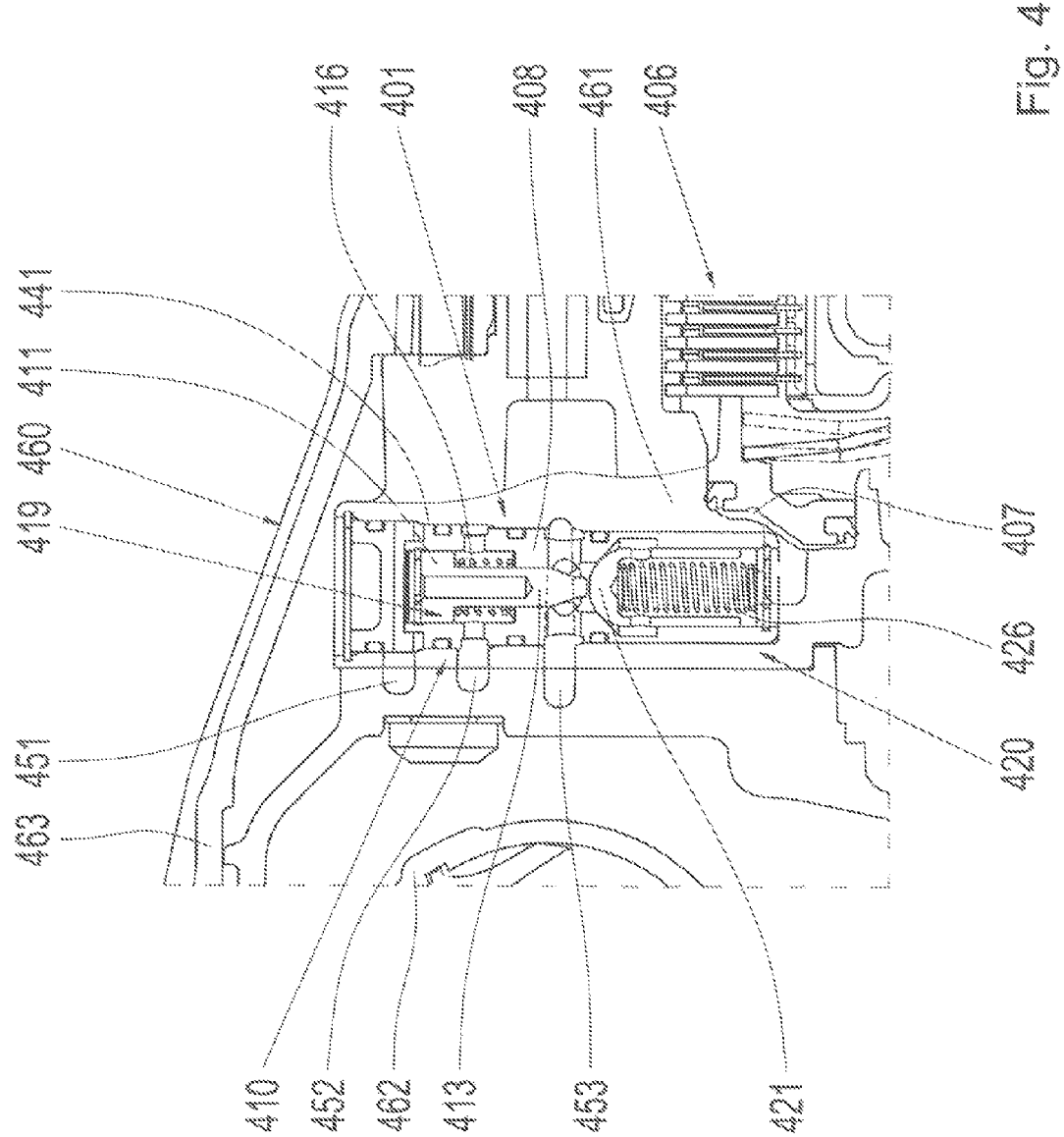

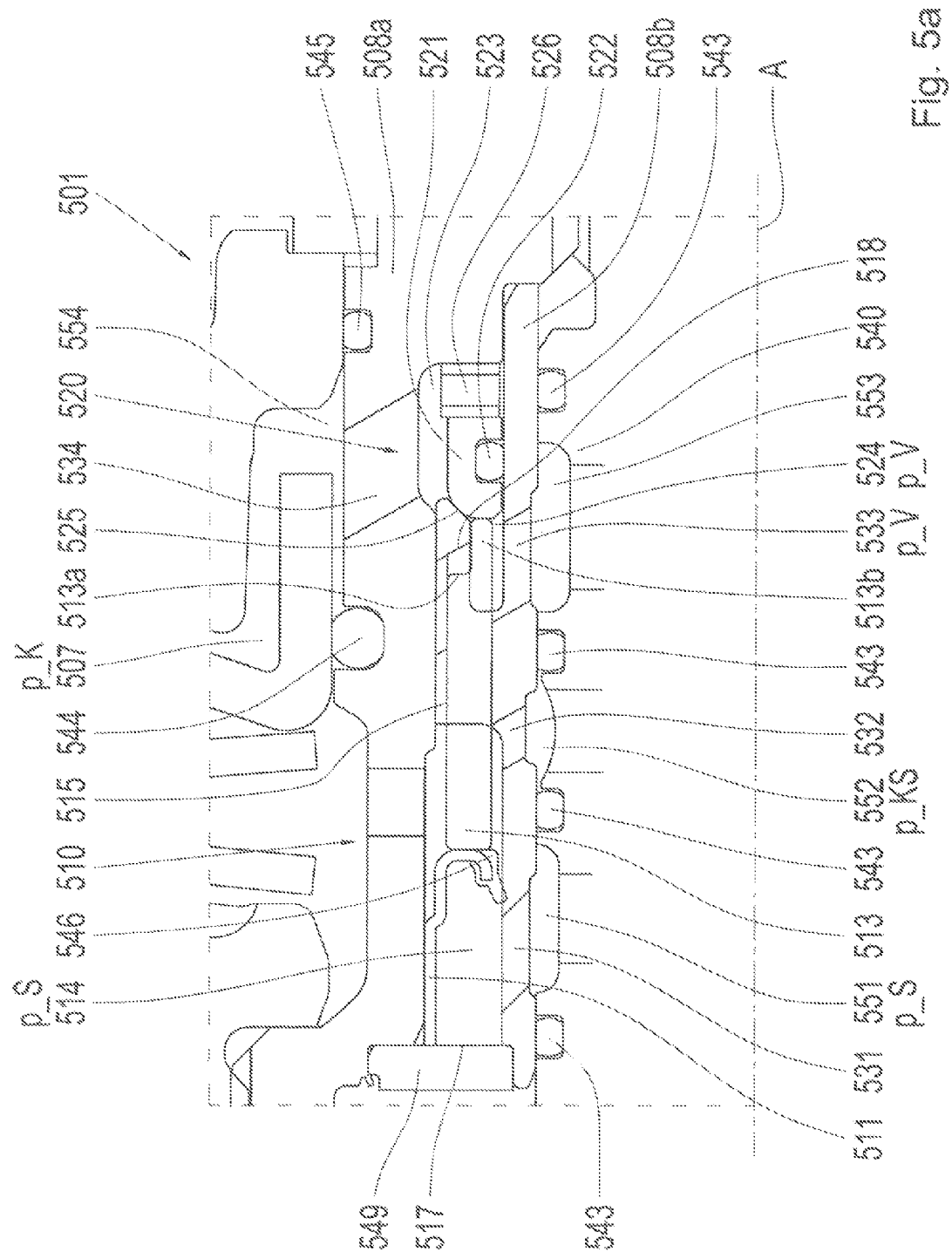

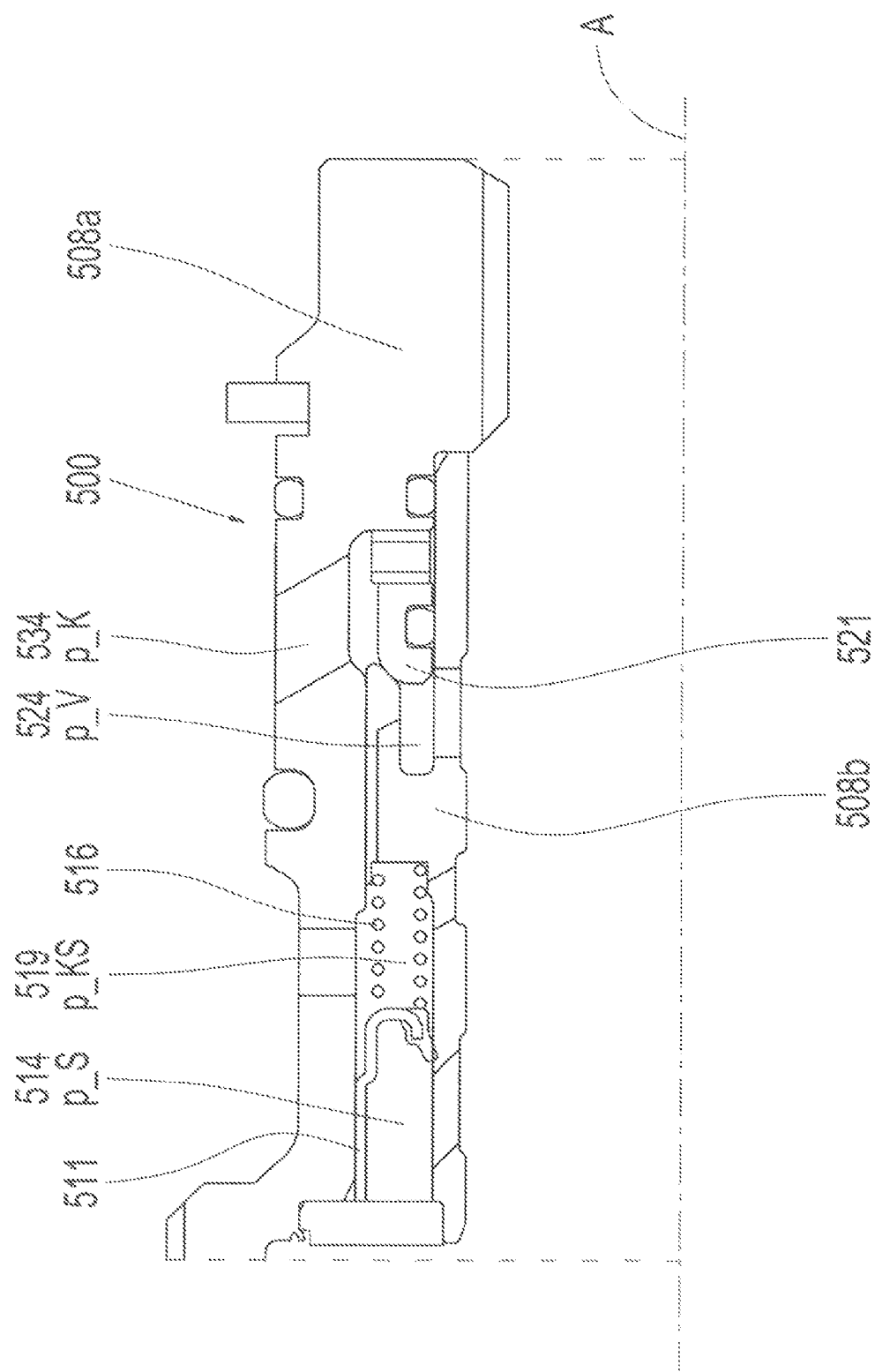

HYDRAULIC CONTROL DEVICE FOR AN AUTOMATIC TRANSMISSION

FIELD OF THE INVENTION

The invention relates generally to a hydraulic control device for an automatic transmission.

BACKGROUND

For automatic transmissions for motor vehicles, for example, from DE 198 58 541 A1, the transmission ratio stages are adjusted by shifting elements, which are frictional-locking couplings or brakes. In the disclosed automatic transmission, couplings that can connect two rotatable elements to each other in a torque-proof manner, and brakes, which connect in a torque-proof manner a rotatable element to a fixed element or to a transmission housing, are formed as multi-disk shifting elements.

In principle, the shifting elements of an automatic transmission can be formed both as frictional-locking multi-disk shifting elements and as positive-locking shifting elements, such as, dog clutches. In automatic transmissions, at least one of the shifting elements is formed to be frictional-locking, in order to carry out power shifts; that is, a change of transmission ratio without interruptions in the pulling force.

With known automatic transmissions, the actuation (that is, the closing of the shifting elements for the transfer of torque) is effected hydraulically; that is, through actuators in the form of piston/cylinder units, which are subjected to pressurized oil. An actuating pressure chamber is formed from the piston and the cylinder, and the shifting element is actuated by pressure oil under an actuating pressure. The pressure oil is conveyed by a motor-driven pump as a pressure source and, during the entire operating period of the automatic transmission, must be held at a pressure level that generates a pressing force of the multi-disks in the shifting element that is sufficient for the transfer of torque. The energy for generating the pressure by the hydraulic pump must be applied by the motor of the motor vehicle, such that the generation of the hydraulic power increases the fuel consumption and therefore CO2 emissions, or reduces the energy available for driving the vehicle due to the power losses. This also reduces the transmission efficiency.

In addition, leakage losses are generated at sealing points such as, for example, pressure oil feeds from the transmission housing through so-called "rotary oil feeds," which are sealed by gap seals (for example, sliding bearings and/or rectangular rings) in the rotating transmission shaft. These require a continuous tracking of the oil pressure in the actuator with a closed shifting element or a replenishment of the leakage quantity, in order to keep the shifting element closed.

In order to make the pressure in the actuator independent of the pressure of the pump, and to minimize the leakage losses, the piston chamber can be blocked by various locking mechanisms, such that the pressure remains in the piston chamber and no further oil has to be conveyed. Only during the shifting process is the valve opened and then filled with the corresponding pressure. A hydraulic control device is known from DE 102 05 411 A1 of the applicant, with which, in the event of a desired transfer of torque, the multi-disk shifting elements that can be closed by pressurization are locked outside the gearshifts by a blocking device, in which a shut-off valve is closed in the feed area of the shifting element. As a result, the pressure in the actuating cylinder, acting as an actuator, and thus the pressing force between the multi-disks, is maintained, without a hydraulic pressure having to be generated by the transmission pump in the magnitude of the actuating pressure of the shifting element.

Depending on the application, shut-off valves can be formed in such a manner that they are "normally closed" or "normally open" with a system pressure at the level of the ambient pressure.

Thus, the pressure to be generated by the transmission pump can be lowered with respect to the actuating pressure enclosed in the shifting element. However, although theoretically possible, the pump is not completely switched off or depressurized since, even with closed and locked shifting elements, the need for oil is maintained at a low pressure level in the transmission, for example for cooling and lubrication or for pre-filling the shifting element to prepare a shifting operation. The power consumption of the transmission oil pump, which is calculated as the product of the delivered volume flow and the generated pressure difference, is significantly reduced by the possible reduction in pressure. With a lower power consumption of the transmission pump, the overall efficiency of the transmission increases, since less engine power has to be branched off as idle power for the hydraulics and is available for the vehicle drive.

However, if, in the closed state of the shut-off valve and thus of the shifting element, the torque of the transmission to be transferred is increased such that the enclosed actuating pressure would have to be increased, the shut-off valve must be opened, which results in a decline in pressure in the shifting element pressure chamber and thus, disadvantageously, in a brief opening of the shifting element or an interruption in the pulling force. Thus, an adjustment of the actuating pressure acting on the frictional-locking shifting element is also not possible in the case of the theoretically possible occurrence of undesired leakages, which can lead to a decrease in the actuating pressure.

SUMMARY OF THE INVENTION

Example aspects of the invention provide a hydraulic control device for a transmission with a hydraulically actuated shut-off valve, which, in a simple and operationally reliable manner, tightly closes the actuating pressure chamber of a shifting element closed under an actuating pressure and thus closes the shifting element independently of the pressure generated by the transmission pump and can enable an increase in the actuating pressure, without this leading to a decline in pressure in the shifting element.

A hydraulic control device for an automatic transmission of a motor vehicle features multiple shifting elements for the shiftable transfer of a torque, and comprises at least one first pressure adjusting device and at least one shut-off valve. Each of the shifting elements features a shifting element cylinder, which, for transferring a torque, can be supplied with a supply pressure from the first pressure adjusting device. The shut-off valve is arranged between the first pressure adjusting device and the respective shifting element cylinder, and can be switched hydraulically by a control pressure from a second pressure adjusting device into at least two shifting positions. In a first shifting position of the shut-off valve, the first pressure adjusting device is hydraulically connected to the shifting element cylinder by the shut-off valve, such that the supply pressure is equal to a shifting element pressure in the shifting element cylinder. In a second shifting position of the shut-off valve, the shifting element cylinder can be tightly closed by the shut-off valve relative to the remaining hydraulic control device and therefore also relative to the first pressure adjusting device. Thus, in the second shifting positioned of the shut-off valve, the shifting element pressure present in the shifting element cylinder cannot fall below a certain value, even if the supply pressure from the first pressure adjusting device is less than the shifting element pressure in the shifting element cylinder.

In accordance with example aspects of the invention, the shut-off valve is formed as an unblockable or releasable check valve and comprises a check valve and an unblocking device, which can be actuated by the control pressure from the second pressure adjusting device.

The advantage of such a hydraulic control device is, on the one hand, that the pressure of the pump, which supplies the control device, does not have to be operated at the level that is necessary to keep a shifting element closed. This results in a lower power capacity of the pump. Moreover, with the shut-off valve in accordance with example aspects of the invention, it is possible to, in the case of a request for transferring an increased torque on the shifting element, increase the pressure through the check valve, without the pressure declining and the shifting element being able to open.

In one example embodiment of the invention, the check valve includes a movable closing body and the unblocking or release device includes a movable unblocking or release body. The closing body is movable between a closed position, in which the shifting element cylinder is closed relative to the remaining hydraulic control device, and at least one open position, in which the shifting element cylinder is open to the remaining control device. In this example embodiment, the unblocking body is movable to an unblocking or releasing stop between a neutral position, in which the unblocking body is not in operative connection with the closing body, and an unblocking or release position. In the unblocking position, the unblocking body acts on the closing body in such a manner that it is moved into the open position by the unblocking body.

The unblocking device may also feature a pressure spring and that the unblocking body can be subjected to the control pressure from the second pressure adjusting device from one side and is loaded with a force of the pressure spring from the other side.

With this example embodiment, the unblocking body may be moved into the unblocking position by the control pressure. A shut-off valve acting in such a manner is referred to as "normally closed," since, with a pressureless hydraulic control device, the shut-off valve is closed.

In an alternative example embodiment of the invention, the unblocking body can be moved into the unblocking position through the action of the force of the pressure spring if the control pressure acting on the unblocking body is only so high that the force on the unblocking body from the control pressure is less than the force of the pressure spring A shut-off valve acting in such a manner is referred to as "normally opened," since, with a pressureless hydraulic control device, the shut-off valve is opened.

In an additional example embodiment of the invention, the unblocking body may include an unblocking or releasing piston and a tappet. The tappet is displaceable with the unblocking piston in an axial manner at least in the direction of the closing body of the check valve.

Advantageously, the check valve may be formed as a seat valve. The seat valve features a greater tightness or seal than a slide valve.

In a preferred example embodiment of the invention, the unblocking piston and at least one longitudinal section of the tappet are formed to be cylindrical. The diameter of the tappet is less than the diameter of the unblocking piston. Thereby, the tappet extends in the axial direction from a front surface of the unblocking piston. In this example embodiment, the shut-off valve features a valve bore, formed in a housing body, with bore sections of different diameters. The bore section may be formed in a sequence comprising, subsequent to each other, an unblocking cylinder bore, a tappet bore, a supply bore and a closing body bore. Thereby, in the unblocking cylinder bore, in a manner axially spaced from each other, a control pressure connection opens to the second pressure adjusting device, and a relief connection opens to a pressureless area or a low-pressure area. In the relief connection, low pressure means pressure that is less than the control pressure and the shifting element pressure. In connection with an automatic transmission, the cooling and lubrication is typically referred to as a low-pressure area. In the supply bore, a supply pressure connection opens to the first pressure adjusting device and, in the closing body bore, a shifting element connection opens to the shifting element cylinder. A valve seat is formed between the supply bore and the closing body bore. In the unblocking cylinder bore, the unblocking piston is arranged in an axially displaceable manner between two stop positions, namely the neutral position and the unblocking position, and is subjected to the force of the preloaded pressure spring on the side of the second connecting channel. In doing so, the tappet is guided into the tappet bore. In the closing body bore, the closing body is axially movable and is pressed against the valve seat in the closed position, if the force from the shifting element pressure on the closing body is greater than the force effected by the supply pressure. The advantages of this example embodiment are the easy ability to manufacture the components of the unblocking device, since they require only external processing and can be produced by rotating, and, given their compact structure, a low need for installation space.

With a "normally closed" example embodiment of the shut-off valve, the unblocking piston diameter, and thus the effective area subjected to the control pressure, may be selected such that, even at a minimum pressure generated by the pump with a blocked shifting element cylinder, the control pressure is sufficient to move the closing body into the open position by the unblocking body.

As an alternative to this, with an example embodiment of the shut-off valve as "normally opened," the unblocking piston diameter of the unblocking piston, and thus the effective area subjected to the control pressure, may be selected such that, even at a minimum pressure generated by the pump with a blocked shifting element cylinder, the control pressure is sufficient to hold the unblocking body in the neutral position counter to the force of the pressure spring. The characteristic curve of the pressure spring and the effective area of the closing body that is subjected to the shifting element pressure is thereby selected such that the force of the pressure spring is sufficient to move the closing body into the open position, even with the maximum arising shifting element pressure, by the unblocking body.

In an advantageous example embodiment, the shut-off valve may be arranged in a shaft of a transmission. As a result, the shut-off valve is to be housed in a transmission in a manner neutral to installation space.

The closing body is preferably formed as a seat piston. The end of the piston seat turned towards the valve seat is formed as a sphere or a cone. The advantages of this are an axial displaceability of the seat piston with a secure guidance and a tight closing of the check valve through the spherical formation of the closing end.

In this connection, it is possible that a valve spring, which is formed as a pressure spring, is arranged in a preloaded state between the seat piston and an end of the closing body bore opposite the valve seat, the force of which is effective on the seat piston in the direction of the valve seat. This advantageously ensures a safe and tight closing of the check valve.

A preferred example variant is formed in such a manner that the unblocking cylinder bore, the tappet guide, the supply bore and the closing body bore, along with the unblocking piston and the tappet, are concentric with each other. Advantageously, these can be produced easily and cost-effectively. In addition, given the concentric arrangement, in particular at the shaft in which the shut-off valve is arranged, there is no imbalance.

In this case, axial positions and lengths of the unblocking cylinder bore, the tappet guide, the supply bore and the closing body bore, along with the unblocking piston and the tappet, are selected in such a manner that, in the unblocking position of the unblocking piston, the tappet projects into the closing body bore that the tappet forms a stop for the closing body, such that the closing body is in an open position.

An advantageous example variant of the hydraulic control device is formed in such a manner that the shut-off valve includes a housing body, in which the unblocking device and the check valve are arranged, such that the shut-off valve forms a modular unit. Advantageously, it is possible to preassemble the shut-off valve as a whole. The housing body has a cylindrical outer contour with an outer diameter or with a multiple number of cylindrical sections with different outer diameters, such that the shut-off valve can be inserted into a correspondingly designed valve receiving bore. For cylindrical forms, whether graduated or continuous, the machining of the corresponding gear component, in which the shut-off valve is to be used, is simple and cost-effective. In addition, the circular cross-sectional shapes can be easily sealed by sealing rings. The outer contour of the housing body represents the interface to the corresponding gear component, for example a shaft or a housing, with regard to the transfer of a liquid operating medium.

In an additional alternative example embodiment of the invention, the closing body and the unblocking piston of a shut-off valve are formed in a ring shape. Thereby, the unblocking piston is arranged in a hollow cylindrical unblocking piston chamber, and the closing body is arranged in a hollow cylindrical closing body chamber. The unblocking piston chamber and the closing body chamber are formed within a housing body enclosing a shaft. Thereby, the shut-off valve comprises multiple tappets. The closing body is preloaded against a ring-shaped valve seat by a spring element. At least one pressure spring element is arranged between the unblocking piston and one end of the unblocking piston chamber. The tappets are formed and arranged such that they can be displaced with the unblocking piston at least in the direction of the closing body if the unblocking piston moves into the unblocking position, and can be displaced from the closing body in the opposite direction if the unblocking piston is in the neutral position. In this example embodiment, a control pressure connection, a supply pressure connection, a shifting element connection and a relief connection open radially from the inside or from the outside into the closing body chamber and the unblocking piston chamber.

Thereby, the control pressure connection and the supply pressure connection are connected to one of the two pressure adjusting devices. The shifting element connection is connected to the shifting element cylinder, and the relief connection is connected to a pressureless area or a low-pressure area. Advantageously, the shut-off valve can be arranged in a transmission in a space-saving manner, since, due to the hollow cylindrical or sleeve-shaped design, the radial extension is small.

The pressure spring element can preferably be formed as a coil spring. These have advantages in terms of cost and ability to mount.

Preferably, the length of the tappet in conjunction with the axial position of the unblocking piston in the unblocking position and the axial position of the valve seat may be selected in such a manner that the tappet extends so far through the valve seat into the closing body chamber that the tappet forms a stop for the closing body, such that the closing body is in an open position.

In addition, an automatic transmission may feature a hydraulic control device in accordance with example aspects of the invention, which is designed as described above. Due to the possible reduction of the pressure generated by the pump by the shut-off valve, the fuel consumption, and thus carbon dioxide emissions, can be reduced.

BRIEF DESCRIPTION OF THE DRAWINGS

Embodiments of the methods in accordance with example aspects of the invention are shown in the drawings and are described in detail below.

The following is shown:

FIG. 4 an example design of a shut-off valve, which is arranged in a transmission housing;

FIG. 5a a first partial section of an example design of a shut-off valve, which is arranged around a shaft;

FIG. 5b a second partial section of an example embodiment of a shut-off valve, which is arranged around a shaft, and FIG. 6 plots of the chronological progression of the pressures of the shut-off valve in accordance with examples aspects of the invention during operation as a function of the engine torque to be transferred by a shifting element.

DETAILED DESCRIPTION

Figure 1:
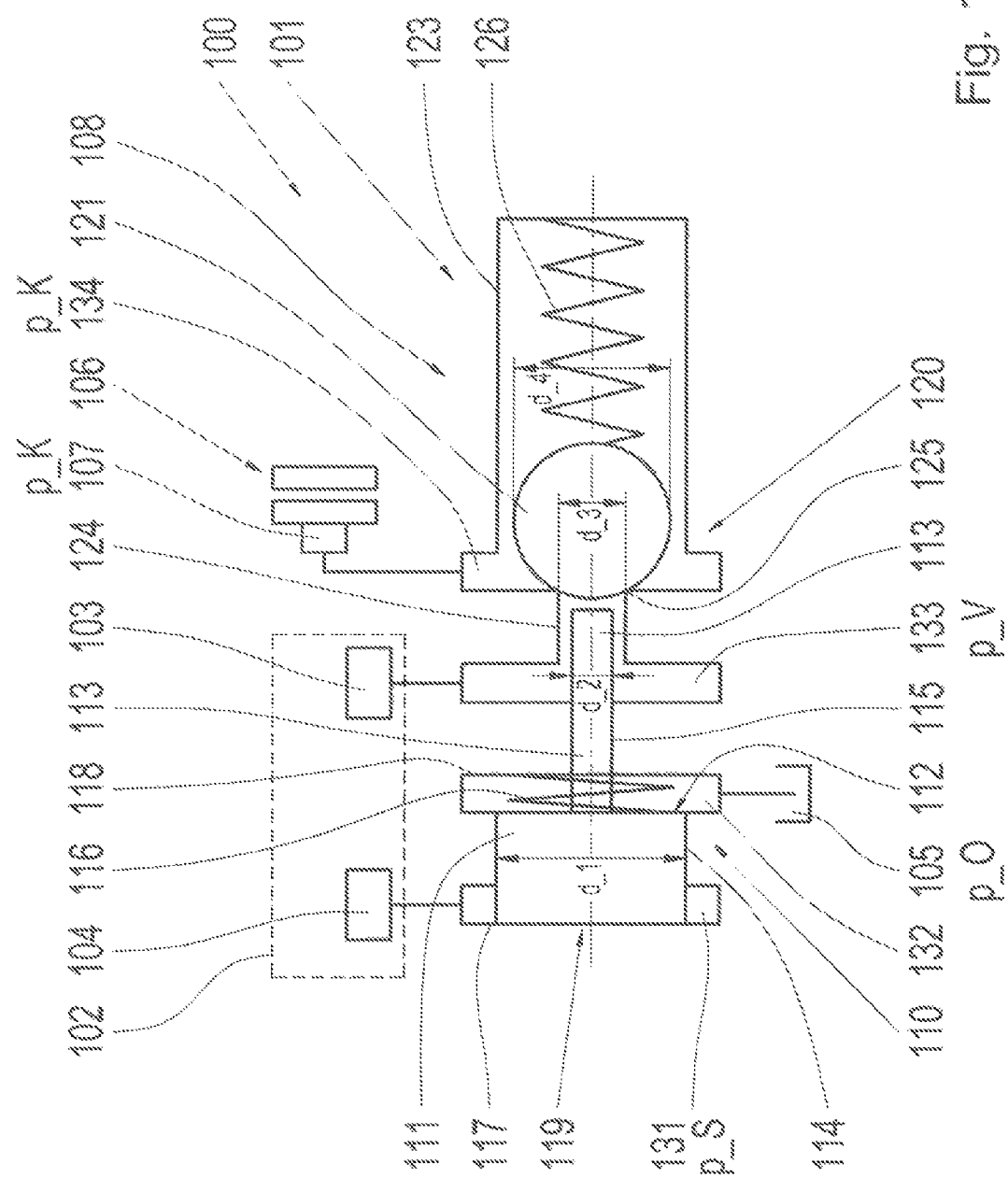
FIG. 1 a schematic illustration of the structure of an example design of a shut-off valve, which is designed to be "normally closed"

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic illustration of a hydraulic control device 100. This comprises a hydraulic shifting device 102, a shifting element 106 and a shut-off valve 101. The shut-off valve 101 is arranged hydraulically between the hydraulic shifting device 102 and the shifting element 106. Thus, the hydraulic shifting device 102 can be connected to the shifting element 106 by the shut-off valve 101, or can be separated from the shifting element 106 by the shut-off valve 101.

The shut-off valve 101 is formed as an unblockable or releasable check valve and includes an unblocking or release device 110 and a check valve 120. The check valve 120 permits a flow only in one direction and blocks against a throughflow from the other direction. By the unblocking device 110, this blocking can be lifted, which is also referred to as unblocking or releasing.

In housing body 108, a valve bore, which has a multiple number of bore sections with different diameters, is formed. The bore sections are hereinafter referred to as the unblocking cylinder bore 114, the tappet guide 115, the supply bore 124 and the closing body bore 123.

The tappet guide 115 adjoins the unblocking cylinder bore 114. In the area of the unblocking device 110, the unblocking cylinder bore 114, which features diameter $d\_1$ that is greater than a diameter $d\_2$ of the tappet guide 115 is formed. Within the unblocking cylinder bore 114, a cylindrical unblocking piston 111 is arranged in a displaceable manner axially between two stop positions 117 and 118, which are the ends of the unblocking cylinder bore 114. A stop position is designated as a neutral position 117 and a second stop position is designated as an unblocking stop 118. A tappet 113, which also has a cylindrical shape, is arranged on a front surface 112 of the unblocking piston 111. The tappet 113 and the unblocking piston 111 form an unblocking body 119. In the example shown in FIG. 1, this is designed in one piece. However, it is also possible that the tappets and unblocking pistons are separate components, which are in operative connection with each other. A pressure spring 116 is arranged between the unblocking piston 111 and the unblocking stop 118; the pressure spring 116 exerts a force on the unblocking piston 111 in the direction of the neutral stop 117.

A supply bore 124, which features a diameter $d\_3$ that is greater than the diameter $d\_2$ of the tappet guide, and thus also the diameter of the tappet 113, adjoins the tappet guide 115. The supply bore 124 opens into a closing body bore 123, which features a diameter $d\_4$ that is greater than the diameter $d\_3$ of the supply bore 124. The transition from the supply bore 124 to the closing body bore 123 forms a valve seat 125.

Within the closing body bore 123, a closing body 121 formed as a ball is arranged, in a manner that is axially movable, between the valve seat 125 and a second end of the closing body bore 123 turned away from the valve seat 125. Thereby, the closing body 121 can assume a closed position if closing body 121 rests against the valve seat 125 and thus closes the supply bore 124 from the closing body bore 123. Thus, the check valve 120 is formed as a seat valve. Compared to a slide valve, this has the advantage of a high degree of tightness or sealing, since, due to the theoretically gap-free contact of the spherical closing body 121 with the circular valve seat 125, no leakage can occur. A valve spring 126 is arranged in a preloaded state between the closing body 121 and the second end of the closing body bore 123; the force of valve spring 126 acts on the closing body 121 in the direction of the valve seat 125.

The unblocking cylinder bore 114 is penetrated radially by a control pressure connection 131, which is connected to a pressure adjusting device 104 of the hydraulic shifting device 102, at the end that represents the stop 117 for the neutral position of the unblocking body 119. The pressure adjusting device 104 adjusts a control pressure $p\_S$, which reaches the unblocking cylinder bore 114 through the control pressure connection 131. There, the unblocking piston 111 is subjected to the control pressure $p\_S$ and is moved into the unblocking position at the unblocking stop 118 counter to the force of the pressure spring 116, if the force of the control pressure $p\_S$ is greater than the force of the pressure spring 116. At the other end of the unblocking cylinder bore 114, which represents the unblocking stop 118, the unblocking cylinder bore 114 is penetrated radially by a pressure chamber 132, which is connected to a pressureless area 105. The term "pressureless" in this connection means a pressure that at least approximately corresponds to the ambient pressure $p\_0$ of the surrounding atmosphere.

The supply bore 124 is radially penetrated by a supply pressure chamber 133. Supply pressure chamber 133 is connected to a pressure adjusting device 103 of the hydraulic shifting device 102, whereas a supply pressure $p\_V$ is adjusted or regulated by the pressure adjusting device 103. The closing body bore 123 is penetrated radially at a transition of the closing body bore 123 in the supply bore 124 by a shifting element pressure chamber 134. The shifting element pressure chamber 134 is connected directly to a shifting element cylinder 107 of the shifting element 106.

FIG. 1 shows the elements of the shut-off valve 101 in the positions that the elements occupy in the pressureless state of the hydraulic control device. A pressureless state exists, for example, upon a standstill of the pump, if pressure that is at least approximately ambient pressure prevails in all of the pressure chambers. Since the control pressure $p\_S$ is pressureless, the unblocking body 119 is pressed into the neutral position at the stop 117 under the action of the preloaded pressure spring 116. The ball-shaped closing body 121 is pressed against the valve seat 125 under the force of the valve spring 126, such that the check valve 120 is closed. A shut-off valve configured in this manner, which is closed in the pressureless state of the hydraulic shifting device or upon the standstill of the pump and thus a lack of hydraulic actuation, such that the shifting element cylinder 107 is hydraulically separated from the remaining hydraulic control device, is referred to according to such behavior as "normally closed."

If a shift is to be carried out starting from the shown positions of the unblocking body 119 and the closing body 121, with which the shifting element cylinder 107 is to be filled for closing the shifting element 106 and is to be subjected to a shifting element pressure $p\_K$, a liquid operating medium, preferably hydraulic oil, flows from the pressure adjusting device 103 into the supply pressure chamber 133 and the supply bore 124. The control pressure $p\_S$ is adjusted to be pressureless by the pressure adjusting device 104, such that the unblocking piston 111 remains in the neutral position under the force of the pressure spring 116 at the stop 117. Since the check valve 120 is closed, the supply pressure $p\_V$ in the specified branch increases until the compressive force, which is calculated as the product arising from the supply pressure $p\_V$ and the circular area with the diameter $d\_3$ of the closing body 121 subjected to the supply pressure $p\_V$, is greater than the force of the valve spring 126, which presses the closing body 121 against the valve seat 125. The level of the supply pressure $p\_V$ is adjusted by the pressure adjusting device 103. The check valve 120 now opens and the shifting element cylinder 107 is filled by the shifting element pressure chamber 134. By the pressure adjusting device 103, the shifting element pressure $p\_K$ is adjusted to the desired level, which is then subjected to the shifting element cylinder 107 and closes the shifting element 106 for the transfer of torque.

The shifting element pressure p_K, which at this point in time corresponds to the supply pressure p_V, acts on the ball-shaped closing body 121 from all spatial directions, such that the compressive forces are balanced and this is pressed into the valve seat 125 by the force of the valve spring 126, by which the closing body 121 takes the closed position, in which the hydraulic connection between the pressure adjusting device 103 and the shifting element 106 is interrupted.

Thus, the shifting element pressure p_K in the shifting element 106 or the shifting element cylinder 107 is blocked, and is independent of the supply pressure p_V, which can now be reduced or theoretically even made pressureless. If the supply pressure p_V is less than the shifting element pressure p_K, a compressive force, which is calculated as the product of the difference of the two pressures and the circular projection area with the diameter d_3 acts, acts in a sealed manner (that is, in the direction of the valve seat 125) onto the closing body 121. Thus, the pump of the transmission no longer has to generate pressure at the level of the shifting element pressure p_K, such that the drive of the pump now requires a lower power consumption from the drive power of the transmission.

If the shifting element 106 is now to be opened, which is necessary, for example, in the case of a change to the transmission ratio stage, for the presentation of which this shifting element is no longer to be closed, the check valve 120 must be unblocked or opened, such that the shifting element cylinder 107 is connected to the pressure adjusting device 103 and can be put into a pressureless state by pressure adjusting device 103.

For this purpose, the unblocking piston 111 in the control pressure chamber 131 is subjected to the control pressure p_S by the pressure adjusting device 104, and is moved in the direction of the check valve 120 to the unblocking stop 118. The force of the pressure spring 116 and, if the supply pressure p_V is not regulated to be pressureless by the pressure adjusting device 103, the force from the supply pressure p_V, which acts on the end of the tappet 113 with the diameter d_2 turned towards the check valve 120, act counter to the force of the control pressure p_S.

The length of the tappet 113 is selected in such a manner that, during the movement of the unblocking body 119 into the unblocking position, the tappet 113 contacts the closing body 121 before the unblocking piston 111 rests against the unblocking stop 118. If the unblocking piston 111 reaches the unblocking stop 118, the tappet 113 has moved the closing body 121 into an open position, and the shifting element cylinder 107 is hydraulically connected to the pressure adjusting device 103. When the closing body is opened or when the unblocking piston 111 moves to the unblocking stop 118, the force of the control pressure p_S must overcome the forces of the pressure spring 116 and the valve spring 126 along with the compressive forces of the supply pressure p_V and the shifting element pressure p_K.

If the pressure generated by the pump corresponds to the level of the supply pressure p_V, which is lowered when the shifting element is blocked, the control pressure p_S cannot be greater. For this reason, the diameter d_1 of the unblocking piston 111 has been selected in such a manner that a control pressure p_S at the level of the supply pressure p_V is sufficient to displace the unblocking piston 111 against the specified forces at the unblocking stop 118.

The length of the tappet 113 is selected in such a manner that the closing body 121 cannot rest against the valve seat 125 if the unblocking piston 111 at the unblocking stop 118 is in the unblocking position. The check valve 120 is thus unblocked (that is, open). The diameter d_2 of the tappet 113 and the diameter d_3 of the supply bore 124 are selected in such a manner that the ring-shaped surface resulting from the difference in the diameters d_2 and d_3 around the tappet 113 protruding into the supply bore 124 is sufficiently large so that a throttling point does not arise, which could prevent the filling of the shifting element cylinder 107 from the pressure adjusting device 103 by an excessively large flow resistance.

The unblocking body can also be formed in several parts, whereas the tappet and the unblocking body are two components that are not connected to each other. This is possible since, when the unblocking piston moves into the unblocking position, the tappet, which is guided in an axially displaceable manner into the tappet guide, is pressed against the closing body by the unblocking piston. If the unblocking piston is moved back into the neutral position, the tappet is pushed by the closing body to the unblocking piston, if the closing body moves against the valve seat.

With an additional example embodiment of the shut-off valve 101, the valve spring 126 is dispensed with. This is possible since, after the filling of the shifting element cylinder 107 and the lowering of the supply pressure p_V, the operating medium, preferably oil, moves the closing body against the valve seat 125 through a dynamic effect during the backflow from the shifting element cylinder 107 to the supply bore 124. As soon as this closes the valve seat 125, the shifting element pressure p_K acts in axial projection on a circular surface of the closing body 121 with the diameter d_3, and presses the closing body 121 against the valve seat. Advantageously, given the absence of the valve spring, the overall length of the check valve is reduced, as a result of which the shut-off valve as a whole becomes shorter. As an additional advantage, the check valve opens when the shifting element is filled from the pressure adjusting device 103 at a lower supply pressure p_V.

Figure 2:
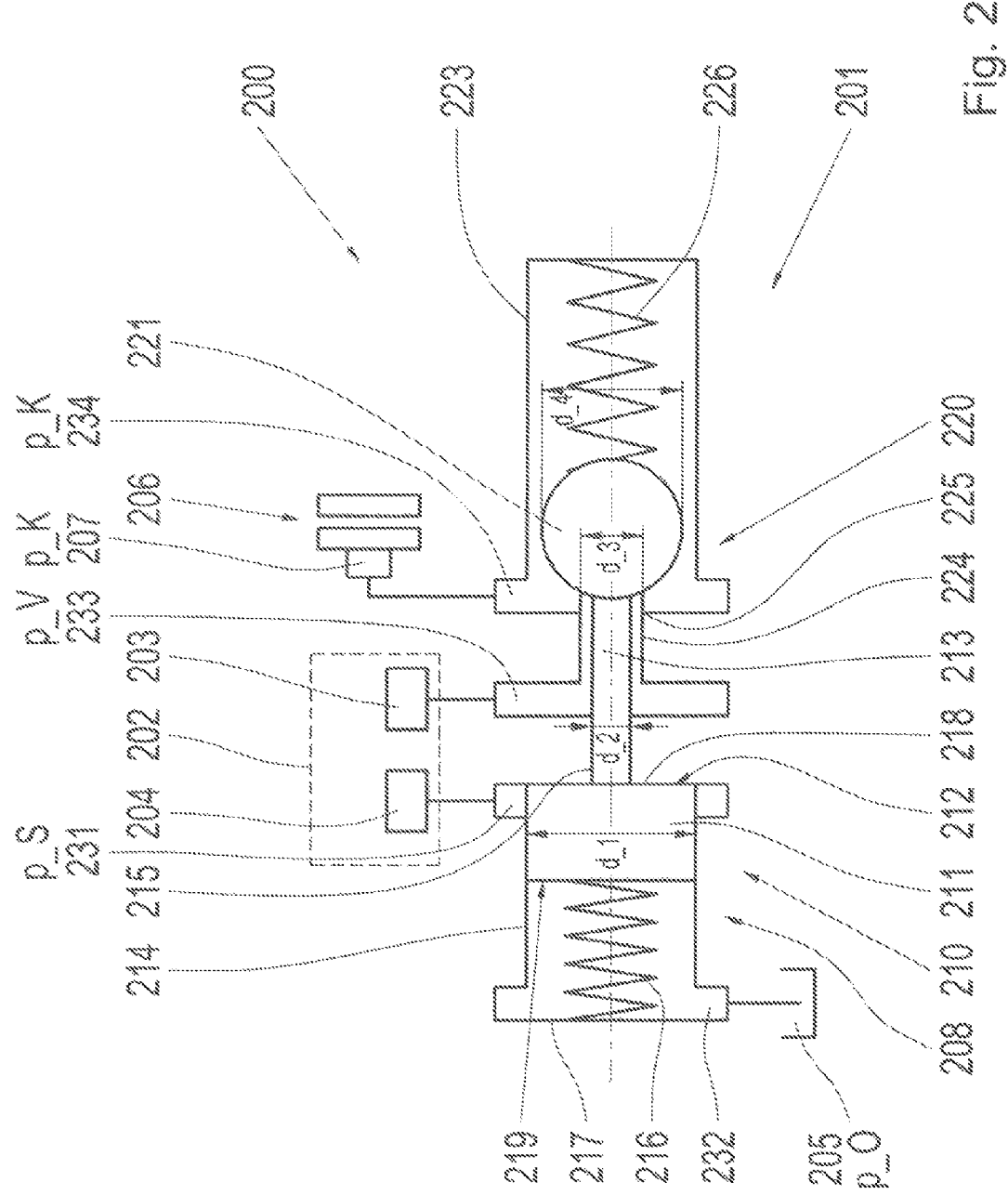
FIG. 2 a schematic illustration of the structure of an example design of a shut-off valve, which is designed to be "normally opened"

FIG. 2 shows a schematic illustration of a hydraulic control device 200. This comprises a hydraulic shifting device 202, a shifting element 206 and a shut-off valve 201. The shut-off valve 201 is arranged hydraulically between the hydraulic shifting device 202 and the shifting element 206. Thus, the hydraulic shifting device 202 can be connected to the shifting element 206 by the shut-off valve 201, or can be separated from the shifting element 206 by the shut-off valve 201.

The shut-off valve 201 is formed as an unblockable or releasable check valve and comprises an unblocking or releasing device 210 and a check valve 220. The check valve 220 permits a flow only in one direction and blocks against a throughflow from the other direction. By the unblocking device 210, this blocking can be lifted, which is also referred to as unblocking or releasing.

In housing body 208, a valve bore, which features a multiple number of bore sections with different diameters, is formed. The bore sections are hereinafter referred to as the unblocking cylinder bore 214, the tappet guide 215, the supply bore 224 and the closing body bore 223.

The tappet guide 215 adjoins the unblocking cylinder bore 214. In the area of the unblocking device 210, the unblocking cylinder bore 214, which features a diameter d_1 that is greater than a diameter d_2 of the tappet guide 215, is formed. Within the unblocking cylinder bore 214, a cylindrical unblocking piston 211 is arranged in a displaceable manner axially between two stop positions 217 and 218, which are the ends of the unblocking cylinder bore 214. A stop position is designated as a stop of the neutral position 217 and a second stop position is designated as an unblocking stop 218. A tappet 213, which also has a cylindrical shape, is arranged on a front surface 212 of the unblocking piston 211. The tappet 213 and the unblocking piston 211 form an unblocking body 219. In the example shown in FIG. 1, this is designed in one piece. However, it is also possible that the tappets and unblocking pistons are separate components, which are in operative connection with each other. A pressure spring 216 is arranged between the unblocking piston 211 and the stop of the neutral position 217; the pressure spring 216 exerts a force on the unblocking piston 211 in the direction of the unblocking stop 218.

A supply bore 224, which features a diameter $d\_3$ that is greater than the diameter $d\_2$ of the tappet guide, and thus also the diameter of the tappet 213, adjoins the tappet guide 215. The supply bore 224 opens into a closing body bore 223, which features a diameter $d\_4$ that is greater than the diameter $d\_3$ of the supply bore 224. The transition from the supply bore 224 to the closing body bore 223 forms a valve seat 225.

The tappet 213 is guided in the tappet guide 215 with a clearance fit that, on the one hand, enables a guide that is largely free of radial backlash and, on the other hand, seals the supply pressure chamber 233 against the control pressure chamber 231.

Within the closing body bore 223, a closing body 221 formed as a ball is arranged, in a manner that is axially movable, between the valve seat 225 and a second end of the closing body bore 223 turned away from the valve seat 225. Thereby, the closing body 221 can assume a closed position if the closing body 221 rests against the valve seat 225 and thus closes the supply bore 224 from the closing body bore 223. Thus, the check valve 220 is formed as a seat valve. Compared to a slide valve, this has the advantage of a high degree of tightness or sealing, since, due to the theoretically gap-free contact of the spherical closing body 221 with the circular valve seat 225, no leakage can occur. A valve spring 226 is arranged in a preloaded state between the closing body 221 and the second end of the closing body bore 223; the force of the valve spring 226 acts on the closing body 221 in the direction of the valve seat 225.

The unblocking cylinder bore 214 is radially penetrated by a control pressure chamber 231, which is connected to a pressure adjusting device 204 of the hydraulic shifting device 202, at the end that represents the unblocking stop 218 for the unblocking position of the unblocking body 219. The pressure adjusting device 204 adjusts a control pressure $p\_S$, by which the unblocking piston 211 can be subjected and can be moved, counter to the force of the pressure spring 226, in the unblocking position at the stop of the neutral position 217. At the other end of the unblocking cylinder bore 214, which represents the stop of the neutral position 217, the unblocking cylinder bore 214 is penetrated radially by a pressure chamber 232, which is connected to a pressureless area 205. A pressureless area hereby means an area in which an ambient pressure $p\_0$ or a pressure close to the ambient pressure $p\_0$ prevails. The term "pressureless" in this connection means a pressure that at least approximately corresponds to the ambient pressure $p\_0$ of the surrounding atmosphere.

The supply bore 224 is radially penetrated by a supply pressure chamber 233. Supply pressure chamber 233 is connected to a pressure adjusting device 203 of the hydraulic shifting device 202, whereas a supply pressure $p\_V$ is adjusted or regulated by the pressure adjusting device 203. The closing body bore 223 is penetrated radially at a transition of the closing body bore 223 in the supply bore 224 by a shifting element pressure chamber 234. The shifting element pressure chamber 234 is connected directly to a shifting element cylinder 207 of the shifting element 206.

FIG. 2 shows the elements of the shut-off valve 201 in the positions that the elements occupy in the pressureless state of the hydraulic control device. A pressureless state exists, for example, upon a standstill of the pump, if pressure that is at least approximately ambient pressure $p\_0$ prevails in at least the hydraulic shifting device 220 and on the pressure side of the pump. Since the control pressure $p\_S$ adjusted by the pressure adjusting device 204 is then also pressureless, the unblocking body 219 is pressed into the unblocking position under the action of the preloaded pressure spring 216 at the unblocking stop 218. In the unblocking position of the unblocking body 211, the tappet 213 projects into the closing body bore 223 through the supply bore 224 and the valve seat 225, and forms a stop there, against which the ball-shaped closing body 221 is pressed by the force of the valve spring 226, such the ball-shaped closing body 221 cannot rest against the valve seat 225 and the check valve 220 is thus opened. Thus, the shifting element cylinder 207 is connected to the remaining hydraulic control device 201 or to the hydraulic shifting device 202 and is consequently also pressureless. A shut-off valve configured in this manner, which is open in the pressureless state of the hydraulic shifting device or upon the standstill of the pump, is referred to as "normally open."

If a shift is to be carried out starting from the shown positions of the unblocking body 219 and the closing body 221, with which the shifting element cylinder 207 is to be filled for closing the shifting element 206 and is to be subjected to a shifting element pressure $p\_K$, a liquid operating medium, preferably hydraulic oil, flows from the pressure adjusting device 203 into the supply pressure chamber 233 and the supply bore 224. The control pressure $p\_S$ is adjusted by the pressure adjusting device 204 at least to such a high level that the control pressure $p\_S$ keeps the unblocking piston 211, counter to the force of the pressure spring 216, in the neutral position at the stop 217. Since the check valve 220 is closed, the supply pressure $p\_V$ in the supply pressure chamber 233 and the supply bore 224 increases until the pressure force, which is calculated as the product arising from the supply pressure $p\_V$ and the circular area with the diameter $d\_3$ of the closing body 221 subjected to the supply pressure $p\_V$, is greater than the force of the valve spring 226, which presses the closing body 221 against the valve seat 225. The level of the supply pressure $p\_V$ is adjusted by the pressure adjusting device 203. The check valve 220 now opens and the shifting element cylinder 207 is filled by the shifting element pressure chamber 234. By the pressure adjusting device 203, the shifting element pressure $p\_K$ is adjusted to the desired level, which is then subjected to the shifting element cylinder 207 and closes the shifting element 206 for the transfer of torque.

The shifting element pressure $p\_K$, which at this point in time corresponds to the supply pressure $p\_V$, acts on the ball-shaped closing body 221 from all spatial directions, such that the compressive forces are balanced and this is pressed into the valve seat 225 by the force of the valve spring 226, by which the closing body 221 takes the closed position, in which the hydraulic connection between the pressure adjusting device 203 and the shifting element 206 is interrupted.

Thus, the shifting element pressure p_K in the shifting element 206 or the shifting element cylinder 207, is blocked and independent of the supply pressure p_V, which can now be reduced, but must not fall below a minimum value. This minimum value is determined by the fact that a control pressure p_S must still be adjustable, which is so high that, in conjunction with the front surface 212 determined by the diameter d_1, the control pressure p_S holds the unblocking body 211 counter to the force of the pressure spring 216 in the neutral position at the stop 217, since, otherwise, the check valve 220 is unblocked. Thus, the shifting element cylinder 207 would be connected to the hydraulic shifting device 202, and the shifting element pressure p_K would be lowered to the reduced supply pressure p_V, which would lead to an undesirable opening of the shifting element 106.

If the supply pressure p_V is less than the shifting element pressure p_K, a compressive force, which is calculated as the product of the difference of the two pressures and the circular projection area with the diameter d_3, acts in a sealed manner (that is, the resulting pressure force acts on the closing body 221) in the direction of the valve seat 225. Thus, the pump of the transmission no longer has to generate pressure at the level of the shifting element pressure p_K, such that the drive of the pump now requires a lower power consumption, corresponding to the level of the supply pressure still to be generated P_V, from the drive power that is fed to the transmission.

If the shifting element 206 is now to be opened, which is necessary, for example, in the case of a change to the transmission ratio stage, for the presentation of which this shifting element is no longer to be closed, the check valve 220 must be unblocked or opened, such that the shifting element cylinder 207 is connected to the pressure adjusting device 203 and can be put into a pressureless state by the pressure adjusting device 203.

For this purpose, the control pressure p_S present in the control pressure chamber 231 is made pressureless by the pressure adjusting device 204, that is, to the ambient pressure p_0, such that the force of the pressure spring 216 moves the unblocking body 219 into the unblocking position and thus opens the check valve 220. It would also be conceivable to not make the control pressure p_S pressureless, but to reduce it to a pressure that exerts a force on the unblocking piston 211 that is smaller than the force of the pressure spring 216.

The length of the tappet 213 is selected in such a manner that the closing body 221 cannot rest against the valve seat 225 if the unblocking piston 211 at the unblocking stop 218 is in the unblocking position. The check valve 220 is thus unblocked (that is, open). The diameter d_2 of the tappet 213 and the diameter d_3 of the supply bore 224 are selected in such a manner that the ring-shaped surface resulting from the difference in the diameters d_2 and d_3 around the tappet 213 protruding into the supply bore 224 is sufficiently large so that a throttling point does not arise, which could prevent the filling of the shifting element cylinder 207 from the pressure adjusting device 203 by an excessively large flow resistance.

The compression spring 216 is designed is such a manner that, upon the maximum deflected unblocking piston 211 (that is, if this is in the unblocking position at the unblocking stop 218), a preloading force of compression spring 216 is sufficient to, counter to the resulting pressure force from the shifting element pressure p_K and supply pressure p_S acting on this, lift the closing body 221 from the valve seat 225 and move closing body 221 into an open position.

With an additional example embodiment of the shut-off valve 201, the valve spring 226 is dispensed with. This is possible since, after the filling of the shifting element cylinder 207 and the lowering of the supply pressure p_V, the operating medium, preferably oil, moves the closing body 221 against the valve seat 225 through a dynamic effect during the backflow from the shifting element cylinder 207 to the supply bore 224. As soon as this closes the valve seat 225, the shifting element pressure p_K acts in axial projection on a circular surface of the closing body 221 with the diameter d_3, and presses the closing body 221 against the valve seat 225. The advantages of the absence of the valve spring have already been mentioned under FIG. 1.

Figure 3:
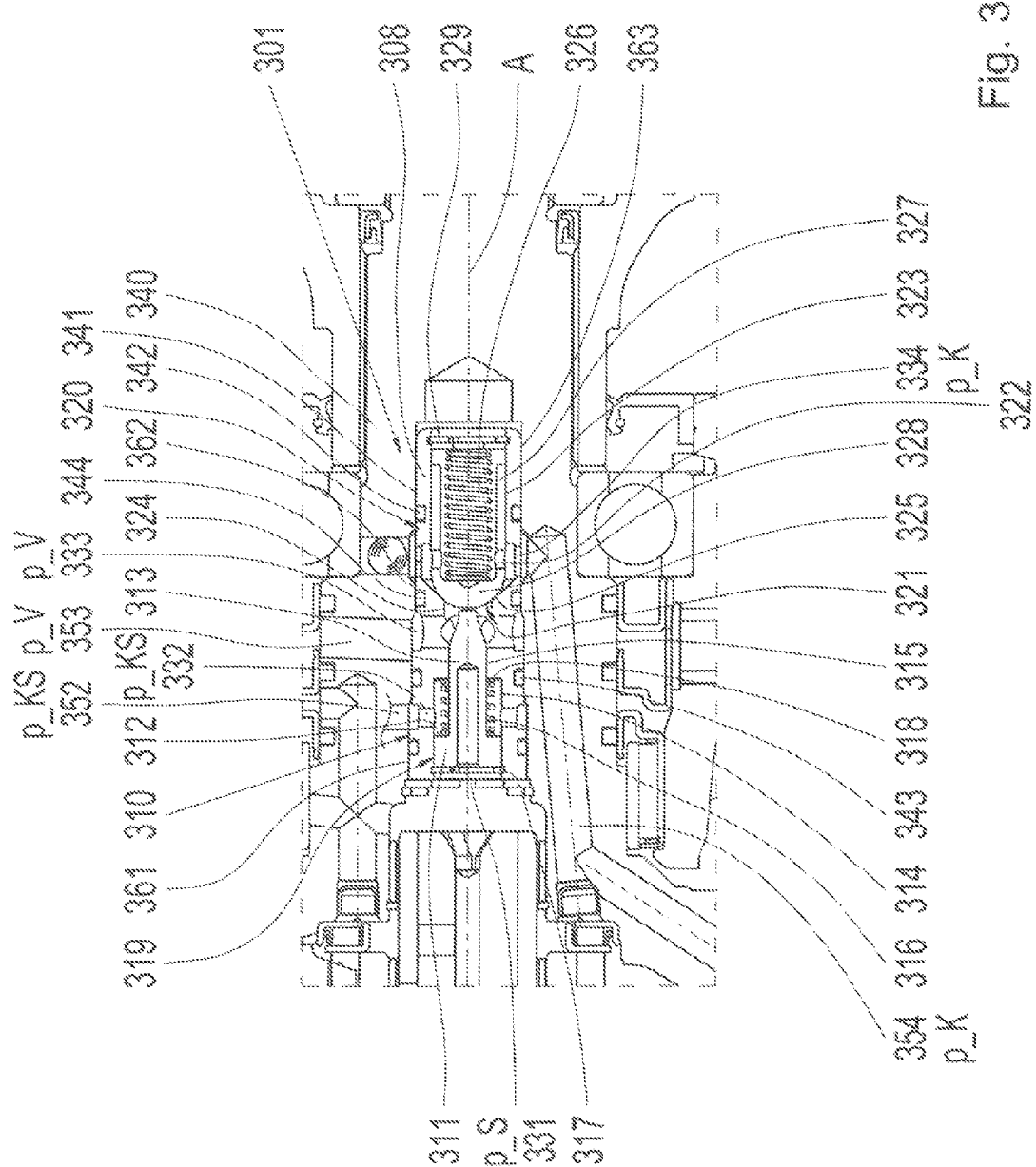
FIG. 3 an example design of a shut-off valve ("normally closed"), which is arranged in a shaft.

FIG. 3 shows a longitudinal section of an example embodiment of a shut-off valve 301 that is arranged in a shaft 340 of a transmission. The shut-off valve 301 comprises an unblocking or releasing device 310 and a check valve 320. The shut-off valve 301 schematically corresponds to the shut-off valve 101 from FIG. 1, and is likewise "normally closed" from its mode of operation.

The unblocking device 310 comprises an unblocking or releasing body 319 and a pressure spring 316. The unblocking body 319 is formed in one piece and features an unblocking or releasing piston 311 and a tappet 313, which are concentric with each other. The unblocking piston 311 is guided in an axially displaceable manner in an unblocking cylinder bore 314, and the tappet 313 is guided in an axially displaceable manner in a tappet guide 315. A control pressure connection 331 opens into the unblocking cylinder bore 314 at an end of unblocking cylinder bore 314 turned away from the check valve 320 and forms the stop of the neutral position 317. The unblocking cylinder bore 314 and the tappet guide 315 are formed in a housing body 308. At the other end 318 of the unblocking cylinder bore 314, which is turned towards the check valve 320, a cooling and lubricating oil connection 332 opens into the unblocking cylinder bore 314 in the radial direction.

Between the unblocking piston 311 and the unblocking stop 318, the pressure spring 316 is preloaded and arranged concentrically around the tappet 313. In contrast to the shut-off valve 101 of the schematic illustration in FIG. 1, the unblocking piston 311 in the unblocking position does not itself abut the end 318 as an unblocking stop, but abuts the pressure spring 316 at the block; that is, the windings of the pressure spring 316 abut each other in the unblocking position.

The tappet 313 projects into a supply bore 324 formed in the housing body 308, into which a supply pressure connection 333, which is likewise formed in the housing body 308, opens radially, through which the operating medium under the supply pressure p_V arrives from a pressure adjusting device (not shown) through a supply channel 353 formed in the shaft 340 into the check valve 320. Subsequent to the supply bore 324, a closing body bore 323 is formed in the housing body 308, in which the closing body 321 of the check valve 320 is arranged in an axially displaceable manner. The transition from the more narrow supply bore 324 into the closing body bore 323 takes place in a conical valve seat 325.

The outer surface of the housing body 308 is cylindrical, whereas, in the embodiment shown in FIG. 3, housing body 308 features a multiple number of cylindrical housing body sections (361, 362, 363) with different outer diameters. However, in principle, it would also be possible for the cylindrical outer contour of the housing body to have only one outer diameter.

The closing body 321 is formed as a seat piston, which features a hollow cylindrical piston section 327 and a spherical piston section 328. The spherical piston section is turned towards the valve seat 325 and rests against the conical valve seat 325 in the closed position of the check valve 320. A shifting element connection 334, likewise formed in the housing body 308, opens into the closing body bore 323 in the radial direction. The shifting element connection 334 leads through a shifting element channel 354 formed in the shaft 340 to a shifting element (not shown).

A valve spring 326 preloaded between the closing body 321 and a check valve closure 329 is arranged within the hollow cylindrical piston section 327. Through radially directed windows 322 in the piston section 327, the interior of the closing body 321 is connected to the shifting element by the shifting element connection 334 and the shifting element channel 354, such that the shifting element pressure p_K prevailing in the shifting element can act on the closing body 321 in the direction of the valve seat 325.

Based on the arrangement of the shut-off valve 301 with the housing body 308, or the stepped or completely cylindrical outer contour of the housing body 308, and all components arranged within the housing body 308, the shut-off valve 301 can be employed as a closed unit in the respective installation location, in this case in the shaft 340 in a valve receiving bore 341 that is provided for this purpose and can be produced easily. This simplifies assembly and allows a uniform shut-off valve to be arranged in different locations. In the present case, the unblocking body 319 and the closing body 321 are arranged concentrically at the housing body 308. The housing body 308 or the shut-off valve 301 as a whole is arranged concentrically at a shaft axis A of the shaft 340 in this.

In order to avoid leakages, sealing elements are provided between the hydraulic transfer points from the shut-off valve 301 to the shaft 340; these are preferably formed as sealing rings 342, 343, 344. For example, a sealing ring 343 is arranged between the point at which the cooling oil connection 332 passes into the cooling oil channel 352 and the point at which the supply pressure connection 333 passes into the supply channel 353. A sealing ring 344 is arranged between the point at which the supply pressure connection 333 passes into the supply channel 353 and the point at which the shifting element connection 334 passes into the shifting element channel 354, such that, due to pressure differences, leakage currents between individual connections are avoided. The sealing ring 342 is arranged between the point at which the shifting element connection 334 passes into the shifting element channel 354 and the end of the shut-off valve 301, at which the check valve closure 329 is arranged, such that the operating medium under the shifting element pressure p_K cannot escape, which would lead to an undesired lowering of the shifting element pressure p_K. The sealing rings 342, 343, and 344 are typically made of elastic rubber material.

FIG. 4 shows, in a part of a longitudinal section through a transmission, a further installation location of a shut-off valve 401, which is constructed essentially identically to the shut-off valve 301 in FIG. 1. The shut-off valve 401, also shown in longitudinal section, is arranged in an intermediate plate 461 of a multi-part transmission housing 460 in a valve receiving bore 441 in the area of a converter housing 463 enclosed by the transmission housing 460. In principle, the valve receiving bore could also be formed in any other part of the transmission housing, to the extent that the valve receiving bore could be produced there, or sufficient material would be present in such part. From a hydrodynamic torque converter 462, only a partial section is visible.

A shifting element 406 with a shifting element cylinder 407, which is to be blocked by the shut-off valve 401, is arranged directly adjacent to the shut-off valve 401. Like the shut-off valve 301 in FIG. 3, the shut-off valve 401 comprises a housing body 408, in which an unblocking or releasing device 410 and a check valve 420 are formed. The unblocking device 410 comprises an unblocking or releasing body 419, which features a pressure spring 416, an unblocking or releasing piston 411 and a tappet 413. The check valve 420 comprises a closing body 421 and a valve spring 426. Channels and connections of the shut-off valve 401, of which a control pressure channel 451, a cooling oil channel 452 and a supply channel 453 are shown, are formed in the intermediate plate 461. Such a shut-off valve 401, which is structured in a modular manner, can advantageously be arranged at different points in a transmission or the transmission housing, without the need for a redesign of the internal elements of the unblocking device and the check valve, namely the unblocking body and the closing body. Thereby, a modular structure means that the interface, namely the valve receiving bore 441, into which the shut-off valve 401 is inserted into a housing, is always the same and is predetermined by the outer shape of the housing body 408. The shut-off valve 401 can always be the same in the interior of the housing body 408 regardless of the installation location, as are the moving parts of the unblocking device 410 and of the check valve 420. The shut-off valve 401 can also be preassembled and used in a completely assembled state. By using equal parts, such a shut-off valve can be produced cost-effectively.

FIGS. 5a and 5b show a shut-off valve 501 as an additional embodiment. The special feature in this case is that, in the present example, shut-off valve 501 is arranged around a shaft 540, concentric to a shaft axis A of the shaft 540. FIGS. 5a and 5b each show a longitudinal section of the same shut-off valve 501, whereas the two longitudinal sections are connected across the circumference of the shut-off valve at a certain angle and, in this case, have been rotated into the drawing plane.

FIG. 5a shows the shut-off valve 501, a shaft 540 enclosed by shut-off valve 501 and a shifting element cylinder 507 of a shifting element arranged radially outside the shut-off valve 501. The shut-off valve 501 comprises an unblocking or releasing device 510 and a check valve 520. The unblocking device 510 comprises a ring-shaped unblocking or releasing piston 511 and a multiple number of tappets 513, which are distributed across the circumference. A sealing element 546 is arranged on the unblocking piston 511.

The unblocking piston 511 is arranged in an axial (that is, along the shaft axis A) and displaceable manner in a hollow cylindrical unblocking chamber 514, which is formed between an outer housing body 508a and an inner housing body 508b. Thereby, the outer housing body 508a is arranged radially outside the ring-shaped unblocking piston 511 and the inner housing body 508b essentially inside the unblocking piston 511. The tappet 513 is arranged in an axially displaceable manner in a tappet guide 515 formed in the housing body 508b, and is not connected to the unblocking piston 511. Thus, the unblocking tappet 511 and the tappet 513 form a second unblocking body 519. The tappet 513 features a stop section 513a and a tappet tip 513b. A restriction of the unblocking piston chamber 514 at one end of the shut-off valve 501 is an end piece 549, which closes the unblocking piston chamber 514 and the side of which turned towards the unblocking piston 511 forms a stop of the neutral position 517.

FIG. 5b shows one of a multiple number of compression springs 516, which are distributed around the circumference, and are arranged in a preloaded state between the unblocking piston 511 and the inner housing body 508b. In the pressureless state, the unblocking piston 511 is pressed by the compression springs 516 against the end piece 549, and thus against the stop 517 of the neutral position.

In this version, the unblocking piston 511 is designed as a sheet metal ring, which features a shape in its profile, which is opened in a radially inward manner to the inner housing body 508b and axially to the stop 517 and is closed in a radially outward manner towards the outer housing body 508a. A passage is formed in the inner housing body 508b, which passage is connected to a control pressure channel 551 formed in the shaft 540, such that the operating medium, from a pressure adjusting device (not shown), can reach a control pressure chamber 531 formed in the unblocking piston 511 for adjusting the control pressure p_S. In the area of the tappet 513, the inner housing body 508b is connected in a radially inward manner through a cooling oil connection 532 to a cooling oil channel 552 formed in the shaft 540, through which cooling and lubricating oil flows from an area of a hydraulic control device (not shown).

In order to prevent leakage from the control pressure chamber 531 to the cooling oil channel 552, the unblocking piston 511 features a sealing element 546 that creates a seal in a radially inward manner between the unblocking piston 511 and the inner housing body 508b. An unblocking stop 518 and a tapered valve seat 525 are also formed in the inner housing body 508b.

Between the valve seat 525 of the inner housing body 508b and the outer housing body 508a, a closing body chamber 523 is formed, within which a ring-shaped closing body 521 in an axially displaceable manner between a closed position and at least one open position. Adjacent to the closing body chamber 523, on the other side of the valve seat 525 in the inner housing body 508b, an inlet channel 524 is formed; this is connected to a supply pressure connection 533, which is connected in a radially inward manner to a supply channel 553 formed in the shaft 540.

The supply pressure connection 533 can be subjected to the supply pressure p_V from a pressure adjusting device (not shown). The inner housing body 508b features a multiple number of supply pressure connections 533, which are distributed on the circumference. Thus, FIG. 5b shows a sectional plane in which the inlet channel 524, but not the supply pressure connection 533 connected to the inlet channel 524, can be seen. Within the closing body chamber 523, the closing body 521 is displaceable in an axial manner between the valve seat 525 and the outer housing body, or a preloaded ring-shaped valve spring 526 arranged between the closing body 521 and the outer housing body 508a. The closing body chamber 523 is connected to a shifting element cylinder 507 by a shifting element connection 534, which is formed in the outer housing body 508a and extends radially outwards, which, in the actuated state of the shifting element (not shown), is subjected to the shifting element pressure p_K. The shifting element cylinder 507 is sealed by two sealing rings 544 and 545.

In the pressureless state of the hydraulic control device, or upon the standstill of the pump, the supply pressure p_V, the control pressure p_S and the cooling/lubricating pressure p_KS correspond to the ambient pressure, such that, under the action of the pressure springs 516, the unblocking piston 511 is found at the stop 517 in the neutral position, and, under the action of the valve spring 526 and possibly the enclosed shifting element pressure p_K, the closing body 521 rests against the valve seat 525 and blocks the shifting element (not shown). Thus, the arrangement of the shut-off valve 501 shown in FIGS. 5a and 5b is designed as "normally closed."

A coupling between the unblocking piston 511 and the tappet 513 is not required, since, when the unblocking piston 511 is acted on, unblocking piston 511 presses the tappet 513 or tappet tip 513b of unblocking piston 511 against the closure element 521, and lifts closure element 521 from the valve seat 525. The unblocking piston 511 is moved under the action of the control pressure p_S so far as the tappet 513, and thus moves the closure body 531 moved by the tappet, in the direction of the open position of closure body 531, until the stop section 513a rests against the unblocking stop 518.

If the check valve 520 is to be closed again, the control pressure p_S is reduced, as a result of which the unblocking piston 511 is displaced from the compression springs 516 into the neutral position. Since, without the force of the control pressure p_S, the closure element 521 moves again into the closed position under the action of at least the valve spring 526, the tappet 513 is pushed from the closure element 521 back to the unblocking piston 511.

The ring-shaped closing body 521 is guided in an axially displaceable manner on the radially outer circumference of the inner housing body 508b, whereas there is a clearance fit between the contact surfaces of the closing body 521 with the inner housing body 508b. Based on this guide or the ring-shaped design of the closing body 521, the check valve 520 does not comprise a pure seat valve, but comprises a combination of a seat valve and a slide valve. The valve seat 525 has only one sealing flank, which is in contact with the rounded end of the closing body 521. A sealing ring 522 is required to seal the inner shape of the closing body 511.

The control pressure p_S, supply pressure p_V and cooling/lubrication pressure p_KS are supplied to the shut-off valve 501 from the control pressure channel 551, the cooling oil channel 552 and the supply pressure channel 553 of the shaft 540. Sealing rings 543 are arranged between the shaft 540 and an inner contour of the inner housing body 508b; by such sealing rings, the three channels are sealed off from each other.

Figure 6:
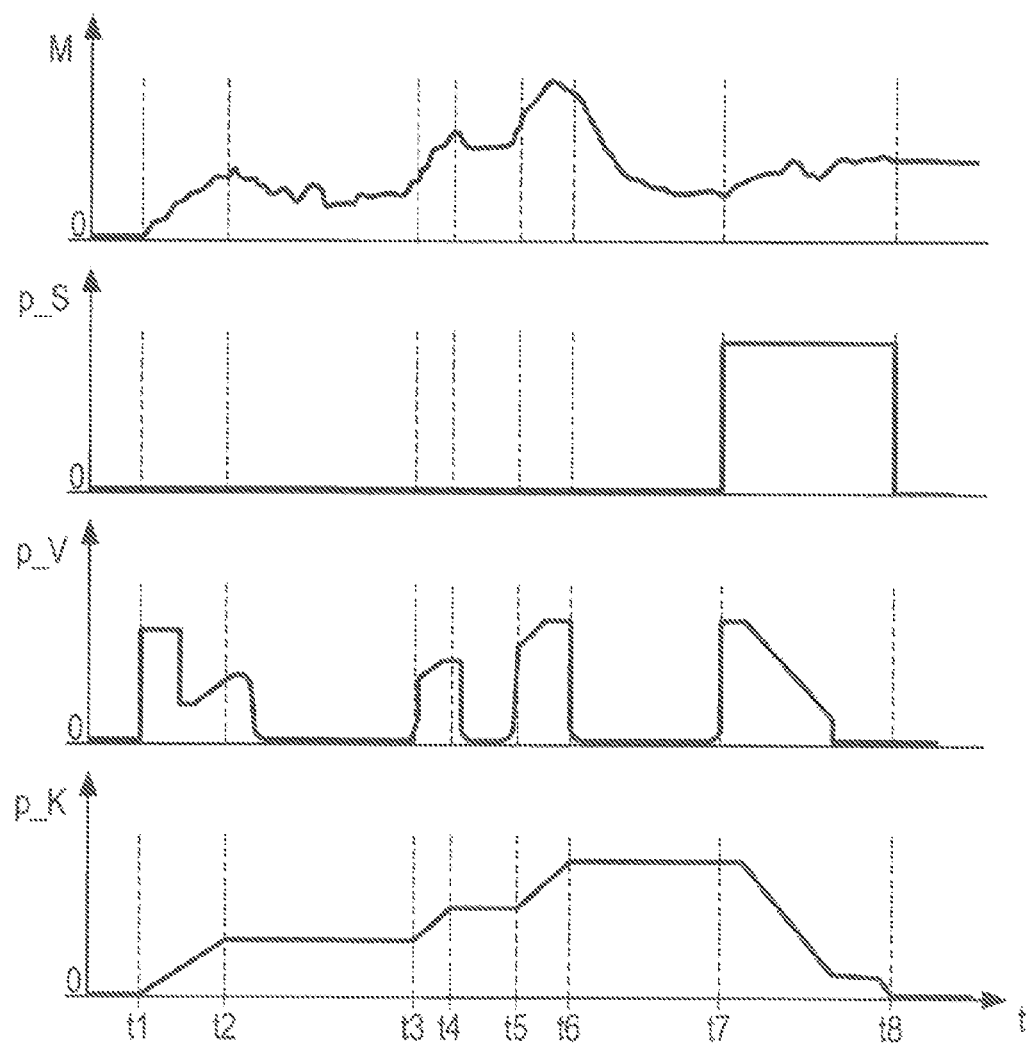

FIG. 6 shows, in a diagram, the progressions of an engine torque M that is generated by a drive unit of a transmission on a shifting element, of the control pressure p_S, of the supply pressure p_V, and of the shifting element pressure p_K over the time t for a shifting process of a shifting element, in front of which a shut-off valve that operates according to the principle "normally closed" is arranged. Embodiments of such a shut-off valve have been described in FIGS. 1, 3, 4, 5a and 5b.

At a point in time t0, a frictional-locking shifting element is still open, since the shifting element cylinder is pressureless or the shifting element pressure p_K is equal to zero, as is the applied engine torque M. The supply pressure p_V that can be adjusted by a pressure adjusting device in a hydraulic shifting device is also pressureless. The unblocking body is in the neutral position, since the control pressure p_S is equal to zero.

At the point in time t1, the engine torque M increases and a shifting command to close the shifting element is issued. In the pressure adjusting device of the hydraulic shifting device, the supply pressure p_V is raised to a pressure level for rapid filling. The shifting element cylinder is filled by the check valve of the shut-off valve. This results in a rise in the shifting element pressure p_K that is adjusted to the progression of the torque M.

Starting from the point in time t2, the engine torque M drops or stagnates. The adjusted shifting element pressure p_K is sufficient for the transfer of torque, and the supply pressure p_V can be lowered, since the check valve does not allow a reduction in the enclosed shifting element pressure p_K.

At the point in time t3, the engine torque M increases, which requires an increase in the shifting element pressure p_K. For this purpose, the supply pressure p_V is increased suddenly to the level prior lowering the supply pressure p_V, and is tracked in accordance with the torque by the supply pressure p_V being raised above the enclosed shifting element pressure p_K. The closing body of the check valve is thereby opened counter to the force of the valve spring and the shifting element pressure p_K, and the shifting element pressure p_K increases.

At the point in time t4, the engine torque M drops or stagnates, such that the supply pressure p_V and thus the pressure generated by the pump can be advantageously lowered. The shifting element pressure p_K enclosed in the shifting element cylinder is sufficient for the transfer of the applied engine motor M.

A repeated increase in the engine torque M at the point in time t5 again requires an increase in the supply pressure p_V in the same manner as at the point in time t3. The shifting element pressure p_K increases correspondingly and, starting from the point in time t6, with a decreasing engine torque M, remains constant at its achieved level.

At the point in time t7, a shifting command to open the shifting element is issued as this is required, for example, in the case of a change to the transmission ratio stage. For this purpose, the shifting element pressure p_K is to be reduced to zero or made pressureless, by unblocking the shut-off valve. In order to achieve a controlled lowering of the shifting element pressure p_K, at point in time t7, the supply pressure p_V is increased suddenly to the level prior the supply pressure p_V lowering or to the level of the enclosed shifting element pressure p_K. At the same time, the control pressure p_S is likewise actuated abruptly, which causes a displacement of the unblocking body into the unblocking position and thus an unblocking of the check valve, by which the shifting element cylinder is hydraulically connected to the pressure adjusting device for the supply pressure p_V.

Since the supply pressure p_V is at the level of the enclosed shifting element pressure p_K, this does not decline when the check valve is unblocked. After unblocking, which takes place in a finite time, the pressure element p_K drops to the ambient pressure p_0 shortly after the point in time t7, since the shifting element cylinder is now connected to a pressureless area by the pressure adjusting device in the hydraulic shifting device. At the point in time t8, the ambient pressure p_0 in the shifting element cylinder is achieved, and the shifting element is fully open. The control pressure p_S is reduced suddenly or made pressureless, by which the unblocking body once again assumes the neutral position.

Modifications and variations can be made to the embodiments illustrated or described herein without departing from the scope and spirit of the invention as set forth in the appended claims.

REFERENCE SIGNS

100 Hydraulic control device
101 Shut-off valve
102 Hydraulic shifting device
103 Pressure adjusting device
104 Pressure adjusting device
105 Pressureless area
106 Shifting element
107 Shifting element cylinder
108 Housing body
110 Unblocking device
111 Unblocking piston
112 Front surface
113 Tappet
114 Unblocking cylinder bore
115 Tappet bore
116 Pressure spring
117 Stop of neutral position
118 Unblocking stop
119 Unblocking body
120 Check valve
121 Closing body, seat piston
123 Closing body bore
124 Supply bore
125 Valve seat
126 Valve spring
131 Control pressure connection
132 Relief connection
133 Supply pressure connection
134 Shifting element connection
200 Hydraulic control device
201 Shut-off valve
202 Hydraulic shifting device
203 Pressure adjusting device
204 Pressure adjusting device
205 Pressureless area
206 Shifting element
207 Shifting element cylinder
208 Housing body
210 Unblocking device
211 Unblocking piston
212 Front surface
213 Tappet
214 Unblocking cylinder bore
215 Tappet bore
216 Pressure spring
217 Stop of neutral position
218 Unblocking stop
219 Unblocking body
220 Check valve
221 Closing body, seat piston
223 Closing body bore
224 Supply bore
225 Valve seat
226 Valve spring
231 Control pressure connection
232 Relief connection
233 Supply pressure connection
234 Shifting element connection
301 Shut-off valve
308 Housing body
310 Unblocking device
311 Unblocking piston
312 Front surface
313 Tappet
314 Unblocking cylinder bore
315 Tappet bore
316 Pressure spring
317 Stop of neutral position
318 Unblocking stop 319 Unblocking body
320 Check valve
321 Closing body, seat piston
322 Window
323 Closing body bore
324 Supply bore
325 Valve seat
326 Valve spring
327 Piston section
328 Piston section
329 Check valve closure
331 Control pressure connection
332 Cooling oil connection
333 Supply pressure connection
334 Shifting element connection
340 Shaft
341 Valve receiving bore
342 Sealing ring
343 Sealing ring
344 Sealing ring
352 Cooling oil channel
353 Supply channel
354 Shifting element channel
361 Housing body section
362 Housing body section
363 Housing body section
401 Shut-off valve
406 Shifting element
407 Shifting element cylinder
408 Housing body
410 Unblocking device
411 Unblocking piston
413 Tappet
419 Unblocking body
420 Check valve
421 Closing body, seat piston
441 Valve receiving bore
451 Control channel
452 Cooling oil channel
453 Supply channel
460 Transmission housing
461 Intermediate plate
462 Hydrodynamic torque converter
463 Converter housing
501 Shut-off valve
507 Shifting element cylinder
508a Outer housing body
508b Inner housing body
510 Unblocking device
511 Unblocking piston
513 Tappet
513a Stop section
513b Tappet tip
514 Unblocking piston chamber
515 Tappet guide
516 Pressure spring element
517 Stop of neutral position
519 Unblocking body
520 Check valve
521 Closing body, seat piston
522 Sealing ring
523 Closing body chamber
524 Supply channel
525 Valve seat
526 Valve spring
531 Control connection
532 Cooling oil connection
533 Supply pressure connection
534 Shifting element connection
540 Shaft
543 Sealing ring
544 Sealing ring
545 Sealing ring
551 Control pressure channel
552 Cooling oil channel
553 Supply channel
554 Shifting element channel
A Shaft axis
$d\_1$ Diameter of the unblocking piston
$d\_2$ Diameter of the tappet
$d\_3$ Diameter of the valve seat
$d\_4$ Diameter of the closing body
M Engine torque
$p\_K$ Shifting element pressure
$p\_{KS}$ Cooling/lubricating pressure
$p\_S$ Control pressure
$p\_V$ Supply pressure
$p\_0$ Ambient pressure
t Time
$t0$ to $t9$ Points in time

The invention claimed is:

1. A hydraulic control device for an automatic transmission, the automatic transmission comprising a plurality of shifting elements for selective torque transfer, each shifting element of the plurality of shifting elements having shifting element cylinder, the hydraulic control device comprising:
a first pressure adjusting device operable to supply fluid at a supply pressure to the shifting element cylinder of each shifting element of the plurality of shifting elements;
a second pressure adjusting device; and
a shut-off valve arranged between the first pressure adjusting device and a respective shifting element cylinder of the plurality of shifting elements, the shut-off valve hydraulically actuatable with by a control pressure from the second pressure adjusting device into at least a first shifting position and a second shifting position,
wherein, in the first shifting position of the shut-off valve, the first pressure adjusting device is hydraulically connected to the respective shifting element cylinder through the shut-off valve such that the supply pressure is equal to a shifting element pressure in the respective shifting element cylinder,
wherein, in the second shifting position of the shut-off valve, the shifting element cylinder is sealed by the shut-off valve relative to the first pressure adjusting device such that the shifting element pressure in the respective shifting element cylinder is held above a certain value when the supply pressure from the first pressure adjusting device is less than the shifting element pressure in the respective shifting element cylinder, and
wherein the shut-off valve is a releasable check valve, the releasable check valve comprising a check valve and an unblocking device, the unblocking device actuatable by the control pressure from the second pressure adjusting device.

2. The hydraulic control device of claim 1, wherein the check valve comprises a movable closing body, the unblocking device comprising a movable unblocking body, the closing body movable between a closed position and at least one open position, the respective shifting element cylinder closed relative to the first pressure adjusting device in the closed position of the closing body, the respective shifting element cylinder open to the first pressure adjusting device in the at least one open position of the closing body, the unblocking body movable between a neutral position and an unblocking position, the unblocking body is not in operative connection with the closing body in the neutral position, the unblocking body in operative connection with the closing body in the unblocking position such that the closing body is moved into the open position by the unblocking body in the unblocking position.

3. The hydraulic control device of claim 2, wherein the unblocking device comprises a pressure spring, the unblocking body subjectable to the control pressure from the second pressure adjusting device at one side of the unblocking body, the unblocking body loaded with a force of the pressure spring at the other side of the unblocking body.

4. The hydraulic control device of claim 3, wherein the unblocking body is movable into the unblocking position by the control pressure.

5. The hydraulic control device of claim 3, wherein the unblocking body is moveable into the unblocking position by the force of the pressure spring when the control pressure acting on the unblocking body applies a force the unblocking body that is less than the force of the pressure spring.

6. The hydraulic control device of claim 2, wherein the unblocking body comprises an unblocking piston and a tappet, the tappet axially displaceable with the unblocking piston at least towards the closing body of the check valve.

7. The hydraulic control device of claim 6, wherein the check valve is a seat check valve, the unblocking piston and at least one longitudinal section of the tappet are cylindrical, a diameter of the tappet is less than a diameter of the unblocking piston, the tappet extends axially from a front surface of the unblocking piston, the shut-off valve has a valve bore that is formed in a housing body, the valve bore has a plurality of bore sections of different diameters, the plurality of bore sections comprising, in sequence: (1) an unblocking cylinder bore; (2) a tappet bore; (3) a supply bore; and (4) a closing body bore, a control pressure connection opens to the second pressure adjusting device in the unblocking cylinder bore, a relief connection opens to a pressureless area or a low-pressure area in the unblocking cylinder bore, the control pressure connection axially spaced from the relief connection in the unblocking cylinder bore, a supply pressure connection opens to the first pressure adjusting device in the supply bore, a shifting element connection opens to the shifting element cylinder in the closing body bore, a valve seat is formed between the supply bore and the closing body bore, the unblocking piston is arranged in an axially displaceable manner between the neutral position and the unblocking position in the unblocking cylinder bore, the unblocking piston subjected to the force of the pressure spring on the side of the relief connection, the tappet is received in the tappet bore, and the closing body is axially movable in the closing body bore and pressed against the valve seat in the closed position when the force from the shifting element pressure on the closing body is greater than a force effected by the supply pressure.

8. The hydraulic control device of claim 7, wherein the shut-off valve is arranged in a shaft of the automatic transmission.

9. The hydraulic control device of claim 8, wherein the closing body is a seat piston, an end of the seat piston turned towards the valve seat, the valve seal being spherical or conical.

10. The hydraulic control device of claim 9, wherein an additional pressure spring is arranged in a preloaded state between the seat piston and an end of the closing body bore that is opposite the valve seat, a force of the additional pressure spring urging the seat piston towards the valve seat.

11. The hydraulic control device of claim 7, wherein the unblocking cylinder bore, the tappet guide, the supply bore, the closing body bore, the unblocking piston and the tappet are positioned concentrically with one another, the axial positions and lengths of the unblocking cylinder bore, the tappet guide, the supply bore, the closing body bore, the unblocking piston and the tappet selected such that the tappet projects into the closing body bore and forms a stop for the closing body such that the closing body is in the open position in the unblocking position of the unblocking piston.

12. The hydraulic control device of claim 6, wherein a diameter of the unblocking piston is selected such that the control pressure is sufficient to move the closing body into the open position with the unblocking body when the pump generates a minimum pressure with a blocked shifting element cylinder.

13. The hydraulic control device of claim 6, wherein a diameter of the unblocking piston is selected such that the control pressure is sufficient to hold the unblocking body in the neutral position counter to the force of the pressure spring when the pump generates a minimum pressure with a blocked shifting element cylinder, the pressure spring and an effective area of the closing body that is subjected to the shifting element pressure selected such that the force of the pressure spring is sufficient to move the closing body into the open position with the unblocking body when the shifting element pressure is maximized.

14. The hydraulic control device of claim 6, wherein the closing body and the unblocking piston are ring shaped, the unblocking piston positioned in a hollow cylindrical unblocking piston chamber, the closing body positioned in a hollow cylindrical closing body chamber, the unblocking piston chamber and the closing body chamber formed within a housing body enclosing a shaft, and the shut-off valve comprising a plurality of tappets, the closing body preloaded against a ring-shaped valve seat by a spring, at least one pressure spring arranged between the unblocking piston and one end of the unblocking piston chamber, the tappets of the plurality of tappets arranged such that the tappets of the plurality of tappets are displaceable with the unblocking piston at least towards the closing body when the unblocking piston moves into the unblocking position, the tappets of the plurality of tappets also arranged such that the tappets of the plurality of tappets are displaceable away from the closing body when the unblocking piston is in the neutral position, each of a control pressure connection, a supply pressure connection, a shifting element connection for the shifting element cylinder and a relief connection for a pressureless area or a low-pressure area opening radially into the closing body chamber and the unblocking piston chamber.

15. The hydraulic control device of claim 14, wherein a length of the tappets of the plurality of tappets in conjunction with the axial position of the unblocking piston in the unblocking position and the axial position of the valve seat are selected such that the tappets extend through the valve seat into the closing body chamber and form a stop for the closing body such that the closing body is in an open position.

16. The hydraulic control device of claim 1, wherein the shut-off valve comprises a housing body, the unblocking device and the check valve arranged in the housing body such that the shut-off valve forms a modular unit, the housing body having one or more cylindrical outer contours with a respective outer diameter such that the shut-off valve is insertable into a valve receiving bore.

17. An automatic transmission with the hydraulic control device of claim 1.

* * * * *